Sept. 4, 1951    D. J. ALLIA    2,566,868
REVOLUTION COUNTING DEVICE
WITH RADIO-ACTIVE CONTROL
Filed Nov. 19, 1949
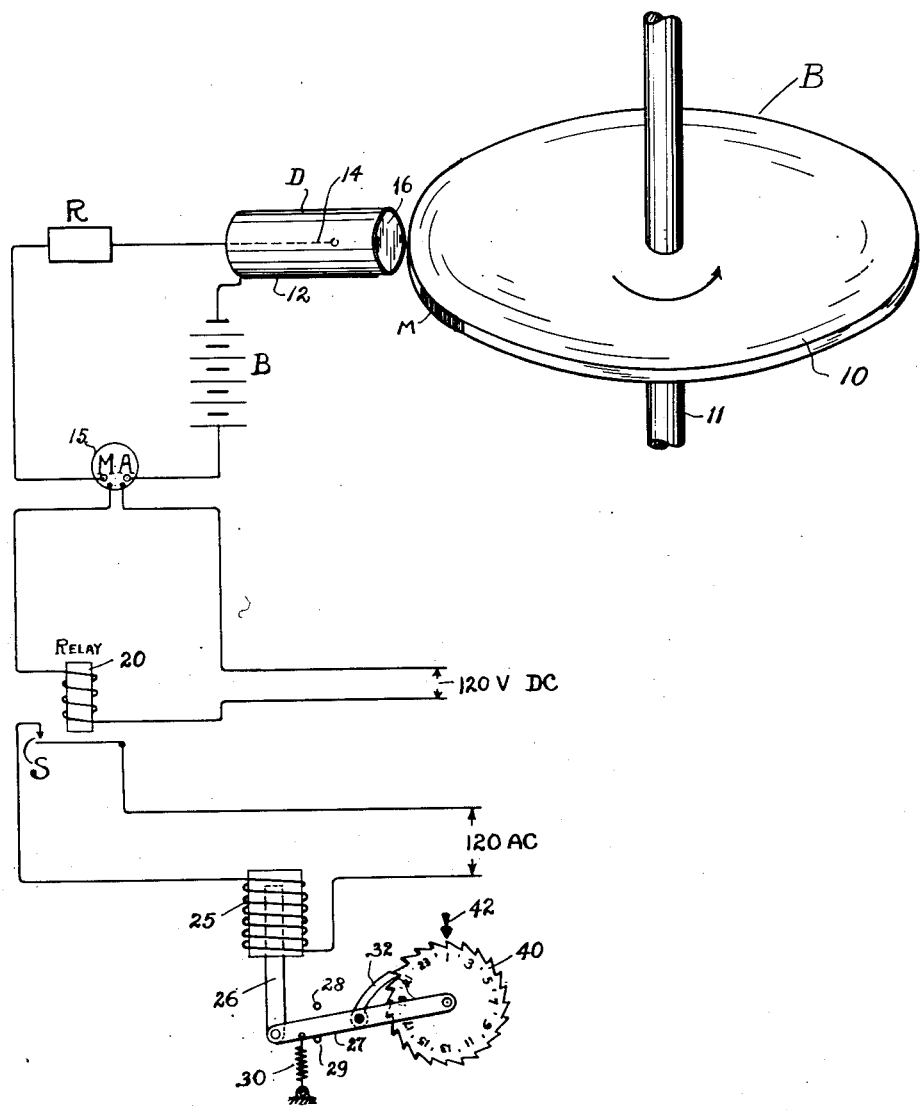
INVENTOR.
D. J. ALLIA
BY
Chas. P. Hawley
ATT'Y.

Patented Sept. 4, 1951

2,566,868

UNITED STATES PATENT OFFICE 2,566,868

REVOLUTION COUNTING DEVICE WITH RADIO-ACTIVE CONTROL

Domenico J. Allia, Worcester, Mass.

Application November 19, 1949, Serial No. 128,460

1 Claim. (Cl. 235—103)

This invention relates to a revolution counting device which is controlled by a radio-active indication. The invention as shown herein is particularly adapted to the testing and calibration of electric watt-hour meters, but the invention is not limited thereto and is capable of much more general application.

It is the general object of the invention to provide a revolution counting device which is controlled by the passage of a portion of radio-active material by an indicating point.

In the preferred construction, a small portion of radio-active material is applied at one spot on the edge of a rotating disc or on the periphery of some other rotating member. At each revolution of the rotating member, this radio-active material passes closely adjacent an indicating device or detector.

I have also shown simple and reliable means to receive and amplify the radio-active indication, and to control and operate a revolution counter thereby.

My invention further relates to arrangements and combinations of parts which will be hereinafter described and more particularly pointed out in the appended claims.

A preferred form of the invention is shown in the drawing, which is a diagrammatic view of apparatus embodying my invention.

Referring to the drawing, a portion of radio-active material M is shown as applied to the edge of a member 10, mounted for rotation with a shaft or spindle 11. The disc 10 may be the usual rotating disc in a watt-hour meter, in which case it rotates continuously when current is flowing through the meter.

The path of rotation of the material M is closely adjacent a detector D which may be of any usual or commercial type. The detector is shown for purposes of illustration as comprising a gas-filled receptacle 12 connected to one pole of a battery B and having an inner conducting member 14 connected through a resistance R and a micro-ammeter 15 to the opposite pole of the battery B.

The detector D preferably has a mica window 16 at the end adjacent the disc 10. Through this window, radio-active rays will pass as the material M rotates adjacent the window 16. These rays will ionize the gas in the receptacle 12, thus permitting current to flow through the gas from the conductor 14 to the receptacle 12, thus completing a circuit which will cause the micro-ammeter 15 to complete a direct current circuit through a magnet or relay 20.

The relay 20 then closes a switch S in an alternating current circuit through a soleniod 25, which solenoid is shown as having a plunger 26 connected to a lever 27 movable between stop pins or abutments 28 and 29 and normally held against the abutment 29 by a spring 30.

The lever 27 carries a feed pawl 32 which engages and intermittently advances a ratchet wheel 40. The wheel 40 is thus advanced one step or tooth for each revolution of the disc 10, and the number of revolutions is shown by an index 42 cooperating with graduations on the ratchet wheel.

After the spot of radio-active material has passed by the detector and no more rays will now enter, the detector becomes non-conducting and the current flow in the micro-ammeter will stop. This will open the contacts on the micro-ammeter, thus restoring the system to normal and ready to record another revolution when the radio-active material next comes in proximity to the detector.

It will be understood that the counting device and the simple means for actuating the same under the control of the micro-ammeter is illustrative only, and that any usual counting device may be actuated by any suitable operating mechanism, so long as said mechanism is controlled by the indications of the detector D and the micro-ammeter 15 or its equivalent.

It will also be understood that the invention is not limited to the described details of construction of the detector D, but that any other suitable detector may be substituted therefor.

My improved revolution counting device under radio-active control has the important advantage that there is no direct or mechanical connection to the rotating member, and that no change in the normal operation of said member is required or is produced by application of my improved counting device thereto.

It should be noted that the rays from the radio-active material are effective only over a very limited range, such as about four centimeters in air, so that they do not activate the detector except when closely adjacent thereto.

Having thus described my invention and the advantages thereof, I do not wish to be limited to the details herein disclosed, otherwise than as set forth in the claim, but what I claim is:

Apparatus effective to count repeated and successive revolutions of a rotating member having a portion of radio-active material applied at one point thereon, which apparatus comprises a detector of radio activity mounted adjacent the annular path of movement of said portion of radio-active material, a counter, actuating mechanism therefor, and electrical control connections between said detector and said actuating mechanism through which said actuating mechanism is controlled by said detector and is rendered operative on each repeated and successive passage of said portion of radio-active material past said detector.

DOMENICO J. ALLIA.

REFERENCES CITED

The following references are of record in the file of this patent:

UNITED STATES PATENTS

| Number | Name | Date |
|---|---|---|
| 1,455,795 | Logan | May 22, 1923 |
| 1,662,429 | Lowy | Mar. 13, 1928 |
| 2,399,061 | Rosenblum | Apr. 23, 1946 |
| 2,436,637 | Downie | Feb. 24, 1948 |
| 2,437,048 | Salles | Mar. 2, 1948 |